(12) United States Patent
Whipple

(10) Patent No.: US 7,594,583 B2
(45) Date of Patent: Sep. 29, 2009

(54) RETAINING SUPPORT MEMBER FOR FUEL FILLER PIPE

(75) Inventor: Matthew S. Whipple, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 499 days.

(21) Appl. No.: 11/360,952

(22) Filed: Feb. 23, 2006

(65) Prior Publication Data

US 2007/0205193 A1    Sep. 6, 2007

(51) Int. Cl.
*B65D 3/00* (2006.01)
*F16L 3/08* (2006.01)
(52) U.S. Cl. .................................. 220/86.2; 248/74.2
(58) Field of Classification Search ............. 220/86.1, 220/86.2, 735; 141/350; 248/74.1, 74.2
See application file for complete search history.

(56) References Cited

U.S. PATENT DOCUMENTS

| 4,573,694 | A | * | 3/1986 | Goto et al. | ............ | 280/834 |
| 5,458,303 | A | * | 10/1995 | Ruckwardt | ............ | 248/74.2 |
| 6,481,673 | B1 | * | 11/2002 | Roe et al. | ............ | 248/62 |
| 6,886,613 | B1 | | 5/2005 | Zahdeh | ............ | 141/286 |
| 7,219,931 | B2 | * | 5/2007 | Kato | ............ | 285/61 |
| 7,422,242 | B2 | * | 9/2008 | Matsumoto et al. | ............ | 280/834 |
| 2005/0139732 | A1 | * | 6/2005 | Kato | ............ | 248/71 |

* cited by examiner

*Primary Examiner*—Harry A Grosso

(57) ABSTRACT

A retaining support member for a fuel filler pipe of a vehicle includes a connecting portion for connection to the fuel filler pipe. The retaining support member also includes a body portion connected to the connecting portion for retention to structure of the vehicle and for supporting the fuel filler pipe off of the structure of the vehicle.

10 Claims, 2 Drawing Sheets

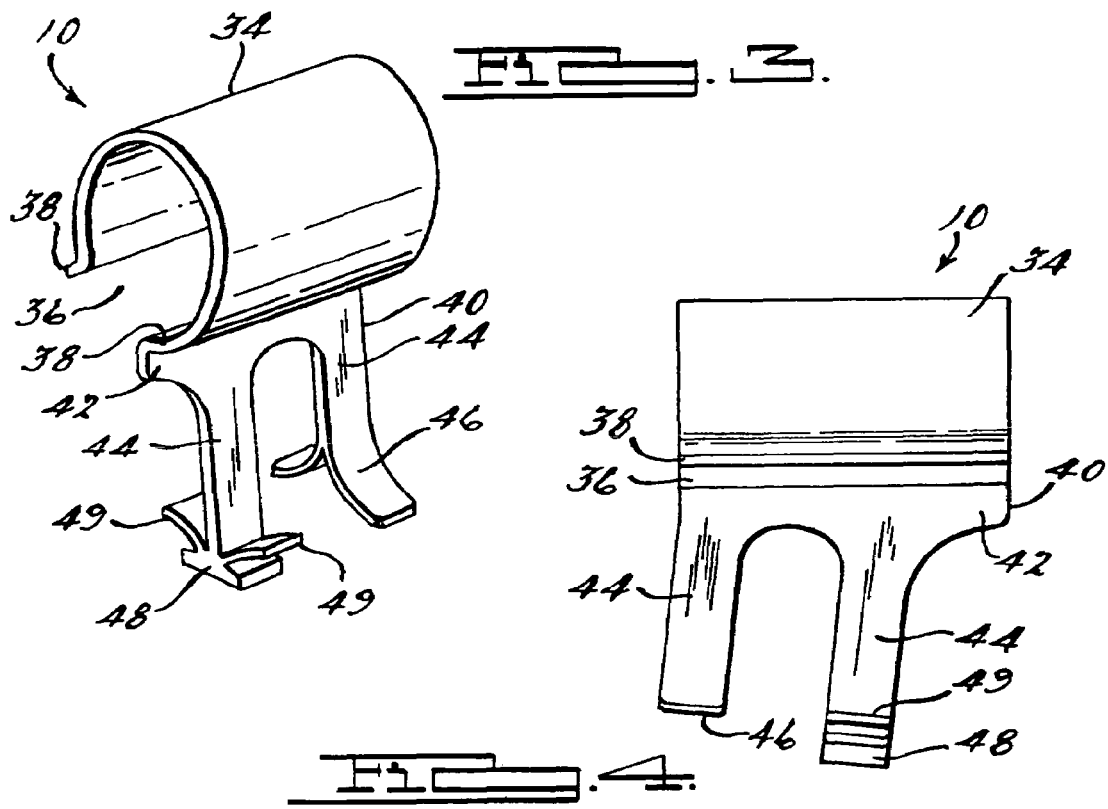
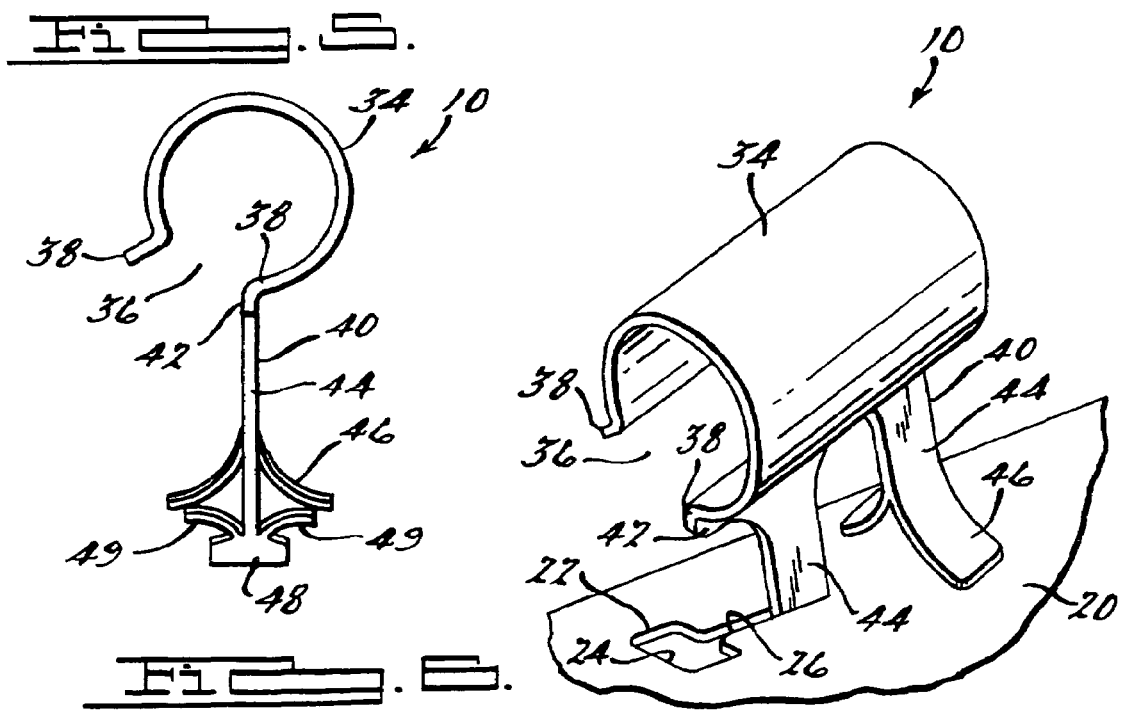

RETAINING SUPPORT MEMBER FOR FUEL FILLER PIPE

TECHNICAL FIELD

The present invention relates generally to fuel filler pipes for vehicles and, more particularly, to a retaining support member for a fuel filler pipe of a vehicle.

BACKGROUND OF THE INVENTION

It is known to provide a fuel filler pipe for a vehicle. In a vehicle such as an automotive vehicle, the fuel filler pipe extends between an externally accessible location of the vehicle and a fuel tank, wherein fueling is accomplished by a user inserting a service station fuel pump nozzle into the fuel filler pipe. The fuel filler pipe typically includes a filler tube connected to the fuel tank, a nozzle entry chamber which has a generally cylindrical shape of a diameter much larger than that of the filler tube, and a filler neck which has a generally frustoconical shape that provides interfacing between the filler tube and the nozzle entry chamber. The nozzle entry chamber has a threaded opening for threadably receiving a selectively removable filler cap (sometimes referred to as a "gas cap") and further has a nozzle guide orifice internally disposed in the nozzle entry chamber in spaced relation with respect to the threaded opening. The fuel filler pipe is interfaced with a body of the vehicle by connection thereto at the nozzle entry chamber.

In operation, a service station user unthreads the filler cap, inserts the service station fuel pump nozzle into the nozzle entry chamber so that it passes through the nozzle guide orifice, and then begins fueling the vehicle. The fueling process is automatically regulated by a fuel shut-off sensor in the pump nozzle. The fuel shut-off sensor senses predetermined differential pressure between the fluid pressure of fuel exiting the pump nozzle and the fluid pressure at an aspirator hole in the pump nozzle so that fuel flow will be automatically shut-off before the fuel can accumulate sufficiently such as to overflow the fuel filler pipe.

The fuel filler pipe is typically unsupported between a body structure connection and a fuel fill tank connection. The fuel filler pipe may be supported by directly contacting the body structure of the vehicle. Further, the fuel filler pipe may produce noise such as rattling due to the interface between the fuel filler pipe and the body structure.

Therefore, it is desirable to provide a support member for a fuel filler pipe in a vehicle to support the fuel filler pipe above structure of the vehicle. It is also desirable to provide a retaining member for a fuel filler pipe in a vehicle to provide a rattle-free interface. It is further desirable to provide a retaining and support member for a fuel filler pipe in a vehicle. Therefore, there is a need in the art to provide a member that meets at least one of these desires.

SUMMARY OF THE INVENTION

Accordingly, the present invention is a retaining support member for a fuel filler pipe of a vehicle. The retaining support member includes a connecting portion for connection to the fuel filler pipe. The retaining support member also includes a body portion connected to the connecting portion for connection to structure of the vehicle and for supporting the fuel filler pipe off of the structure of the vehicle.

One advantage of the present invention is that a new retaining support member is provided for a fuel filler pipe of a vehicle. Another advantage of the present invention is that the retaining support member allows a current build process at an assembly plant to remain untouched yet provide long term fuel fill durability and a rattle-free interface between the chassis and body structures of the vehicle. Yet another advantage of the present invention is that the retaining support member provides adequate cross-car movement with little to no resistance that is required for assembly. Still another advantage of the present invention is that the retaining support member is simple and one-piece. A further advantage of the present invention is that the retaining support member does not require additional components such as fasteners. Yet a further advantage of the present invention is that the retaining support member reduces the required labor that is needed with other conventional brackets. Still a further advantage of the present invention is that the retaining support member is made of plastic and reduces the operations at the fill pipe supplier such as brazing, further reducing costs.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a perspective view of the retaining support member of FIG. 1.

FIG. 4 is a front elevational view of the retaining support member of FIG. 3.

FIG. 5 is a side elevational view of the retaining support member of FIG. 3.

FIG. 6 is a perspective view of the retaining support member of FIG. 3 illustrating installation to the vehicle before the fuel filler pipe is retained.

DESCRIPTION OF THE PREFERRED EMBODIMENT

Figure 1:
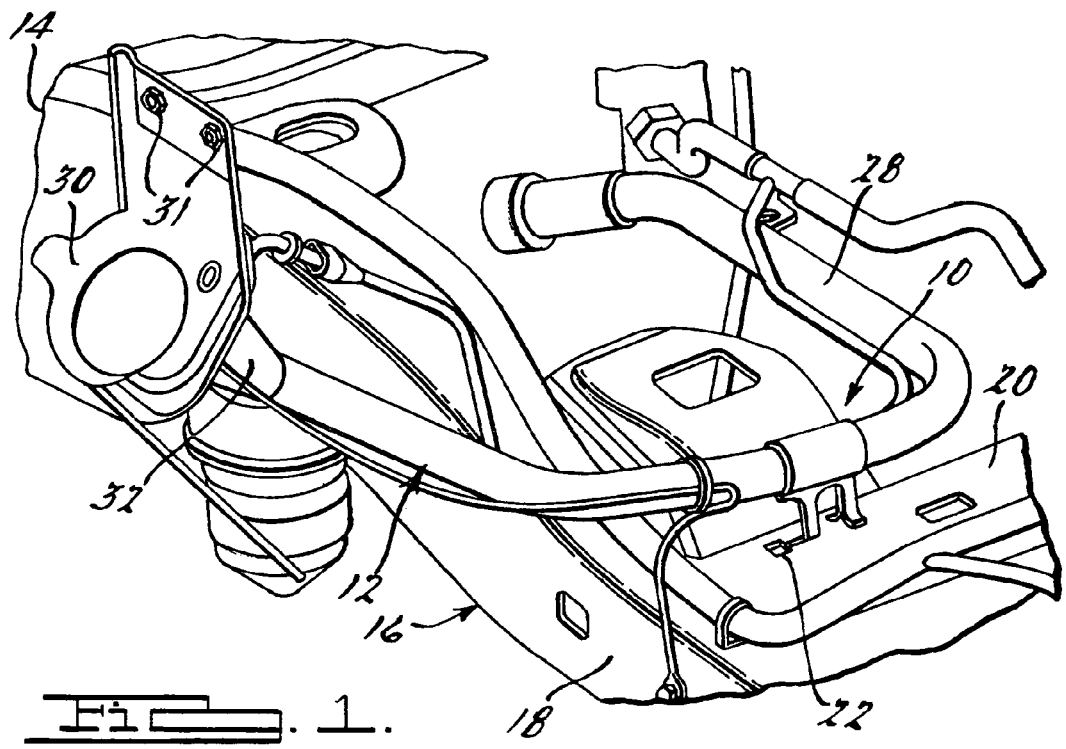
FIG. 1 is a perspective view of a retaining support member, according to the present invention, illustrated in operational relationship with a fuel filler pipe of a vehicle.
Figure 2:
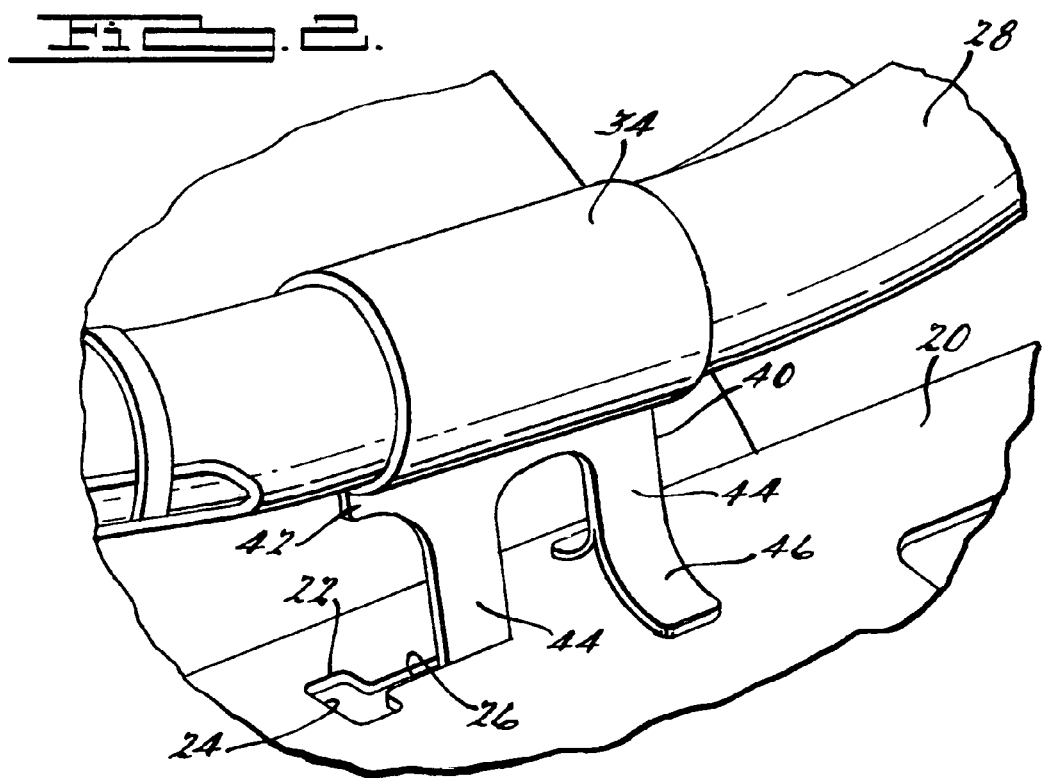
FIG. 2 is an enlarged perspective view of the retaining support member and fuel filler pipe of FIG. 1.

Referring to the drawings and in particular FIGS. 1 and 2, one embodiment of a retaining support member 10, according to the present invention, is shown for a fuel filler pipe, generally indicated at 12, of a vehicle 14, such as a motor or automotive vehicle (partially shown). The vehicle 14 includes vehicle structure such as a frame, generally indicated at 16, having at least one rail member 18 extending longitudinally and at least one crossmember 20 extending laterally from the rail member 18. The crossmember 20 has a slot 22 extending therein and therealong. The slot 22 has an enlarged opening 24 that is generally rectangular in shape. The slot 22 also has a passageway 26 extending along the crossmember 20. The passageway 26 is generally rectangular in shape and has a width less than a width of the opening 24. It should be appreciated that the slot 22 interacts with the retaining support member 10 to be described and provides the location and retention for the retaining support member 10.

The fuel filler pipe 12 includes a filler tube 28 connected to a fuel tank (not shown). The filler tube 28 is a tubular member having a generally circular cross-sectional shape. The filler tube 28 extends across and above the rail member 18 and the crossmember 20. The filler tube 28 is made of a metal material.

The fuel filler pipe 12 also includes a nozzle entry chamber 30 which has a generally cylindrical shape of a diameter much larger than that of the filler tube 28. The nozzle entry chamber 30 has a threaded opening (not shown) for threadably receiving a selectively removable filler cap (not shown). The nozzle entry chamber 30 further has a nozzle guide orifice (not shown) internally disposed in the nozzle entry chamber 30 in spaced relation with respect to the threaded opening. The nozzle entry chamber 30 is connected to vehicle structure such as the frame 16 by a suitable mechanism such as fasteners 31. The nozzle entry chamber 30 is made of a metal material.

The fuel filler pipe 12 further includes a filler neck 32 which has a generally frustoconical shape that provides interfacing between the filler tube 28 and the nozzle entry chamber 30. The filler neck 32 is connected at one end to the nozzle entry chamber 30 and at the other end to the filler tube 28. The filler neck 32 is made of a metal material. It should be appreciated that the fuel filler pipe 12 is conventional and known in the art.

Referring to FIGS. 2 through 5, the retaining support member 10, according to the present invention, includes a connecting portion 34 for connection to the fuel filler pipe 12. In the embodiment illustrated, the connecting portion 34 is generally and arcuately "C" shaped and extends axially to snap fit over the fuel filler pipe 12. The connecting portion 34 has an opening 36 formed between spaced circumferential ends 38 thereof. The opening 36 has a width less than a width of the fuel filler pipe 12. The ends 38 of the connecting portion 34 flex to allow the filler tube 28 to be disposed through the opening 36 and return to retain the fuel filler pipe 12 therein. It should be appreciated that the connecting portion 34 may be secured to the filler tube 28 through any suitable mechanism such as snap fits (plastic or metal), plastic fold over retainer, brazing, projection welding, spot welds, toggle locks, crimping, or molded-in (i.e., plastic fill pipes).

The retaining support member 10 also includes a body portion 40 connected to the connecting portion 34 for retention to vehicle structure such as the crossmember 20. The body portion 40 has a base portion 42 extending from the connecting portion 34. The base portion 42 is generally rectangular in shape. The body portion 40 also has at least one, preferably a pair of leg portions 44 extending from the base portion 42 and spaced therebetween. The leg portions 44 are generally rectangular in shape. The body portion 40 has a support portion 46 at one end of one of the leg portions 44. The support portion 46 has a generally inverted "Y" shape and flexes to act like a spring and keeps a middle portion of the filler tube 28 supported off the cross-member 20 of the frame 16. The body portion 40 also has a retaining portion 48 at one end of the other one of the leg portions 44. The retaining portion 48 has a generally inverted "T" shape. The retaining portion 48 has a pair of tabs 49 forming a generally "Y" shape that flex to act like a spring and keeps the retaining portion 48 within the cross-member 20 of the frame 16. The retaining portion 48 has a width greater than a width of the leg portion 44. The retaining portion 48 is inserted into the slot 22 on the crossmember 20 of the frame 16. The retaining portion 48 catches on the frame 16 and provides for a robust fuel fill interface when users are refueling their vehicle. It should be appreciated that, without the retaining portion 48, heavier loads applied to the refueling nozzle can deform the fuel filler pipe 12.

The retaining support member 10 is made of either a metal material or a plastic material. The retaining support member 10 is a monolithic structure with the connecting portion 34 and body portion 40 being integral, unitary, and one-piece. It should be appreciated that the retaining support member 10 is "universal" such that it may be used for various fuel filler pipes, but could also be non-universal for a specific fuel filler pipe. It should also be appreciated that the retaining support member 10 has an interference with the frame 16 to accommodate for build variation yet still provide for a rattle-free interface.

In operation, the retaining support member 10 is located relative to the frame 16 by disposing the retaining portion 48 into the opening 24 of the slot 22 in the crossmember 20 and moving the leg portion 44 laterally in the passageway 26. In this position, the retaining portion 48 cannot exit the slot 22. The support portion 46 contacts the crossmember 20 to support the connecting portion 34 at an angle as illustrated in FIG. 6. By being angled down, the fuel filler pipe 12 remains clear of the vehicle body during body drop. Following body drop, an operator can then grab the fuel filler pipe 12 and dispose the filler tube 28 through the opening 36 of the connecting portion 34 to secure the filler tube 28 in the connecting portion 34 as illustrated in FIG. 2. As illustrated, the fuel filler pipe 12 will provide an upward force on the retaining support member 10 such that the connecting portion 34 will be substantially horizontal and the retaining portion 48 contacts the crossmember 20 with the weight being supported by the support portion 46. It should be appreciated that the retaining support member 10 is secured to the fuel filler pipe 12 with an integral snap feature and is designed to keep the filler tube 28 off of the frame 16. It should also be appreciated that, once the fuel filler pipe 12 is secured, the retaining support member 10 provides for a robust fuel filling experience and rattle-free interface between the frame 16 and the fuel filler pipe 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A retaining support member for a fuel filler pipe of a vehicle comprising:
   a connecting portion having a general "C" shape for connection to the fuel filler pipe; and
   a body portion connected to said connecting portion, said body portion having a base portion connected to said connecting portion and a pair of leg portions extending from said base portion and spaced transversely from each other for retention to structure of the vehicle, said body portion having a support portion at one end of one of said leg portions with a generally inverted "Y" shape to contact a portion of the vehicle, said connecting portion having an opening facing toward said leg portions and receiving the fuel filler pipe for supporting the fuel filler pipe off of the structure of the vehicle.

2. A retaining support member as set forth in claim 1 wherein said connecting portion has an opening with a width less than a width of the fuel filler pipe.

3. A retaining support member as set forth in claim 1 wherein said connecting portion has a pair of ends that flex to allow a portion of the fuel filler pipe to be disposed therein.

4. A retaining support member as set forth in claim 1 wherein said body portion includes a retaining portion at one end of one of said leg portions.

5. A retaining support member as set forth in claim 4 wherein said retaining portion has a generally inverted "T" shape.

6. A retaining support member as set forth in claim 1 wherein said connecting portion and said body portion are made of either one of a metal material and plastic material.

7. A retaining support member as set forth in claim 1 wherein said connecting portion and said body portion are a monolithic structure being integral, unitary, and one-piece.

8. A fuel filler assembly for a vehicle comprising:
   a fuel filler pipe for operative connection to vehicle structure and a fuel tank of the vehicle; and
   a retaining support member connected to said fuel filler pipe and for connection to the vehicle structure for supporting said fuel filler pipe off of the vehicle structure, said retaining support member having a connecting portion with a general "C" shape to snap fit over said fuel filler pipe and a body portion having a base portion extending from said connecting portion and a pair of leg portions extending from said base portion and spaced transversely from each other with one of said leg portions being disposed in a slot of a vehicle body of the vehicle for retention to the vehicle body, said body portion having a support portion at one end of the other of said leg portions and having a generally inverted "Y" shape to contact the vehicle body, said connecting portion having an opening facing toward said leg portions and receiving said fuel filler pipe for supporting said fuel filler pipe off of said vehicle body.

9. A fuel filler assembly as set forth in claim 8 wherein said body portion includes a retaining portion at one end of one of said leg portions and having a generally inverted "T" shape.

10. A vehicle comprising:
    a frame having at least one slot therein;
    a fuel filler pipe having one end operatively connected to said frame and another end for connection to a fuel tank; and
    a retaining support member having a first portion with a general "C" shape and an opening facing toward said frame to snap fit over said fuel filler pipe and a second portion having a first leg portion with a support portion at one end thereof having a generally inverted "Y" shape that flexes to act like a spring to contact said frame and a second leg portion spaced transversely from the first leg portion having a generally inverted "T" shape disposed in said slot for retention to said frame and for supporting said fuel filler pipe off of said frame.

* * * * *